Patented June 20, 1939

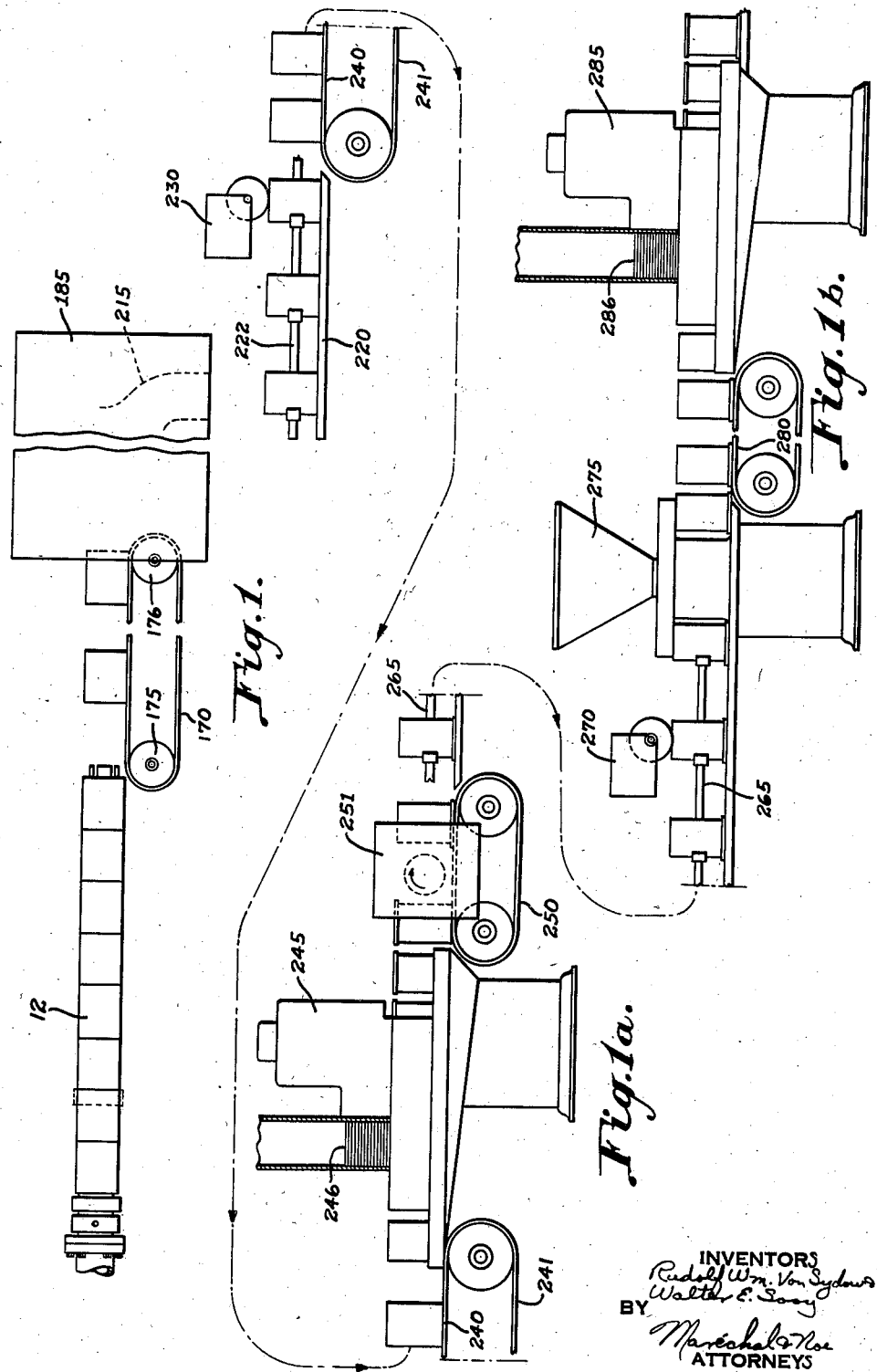

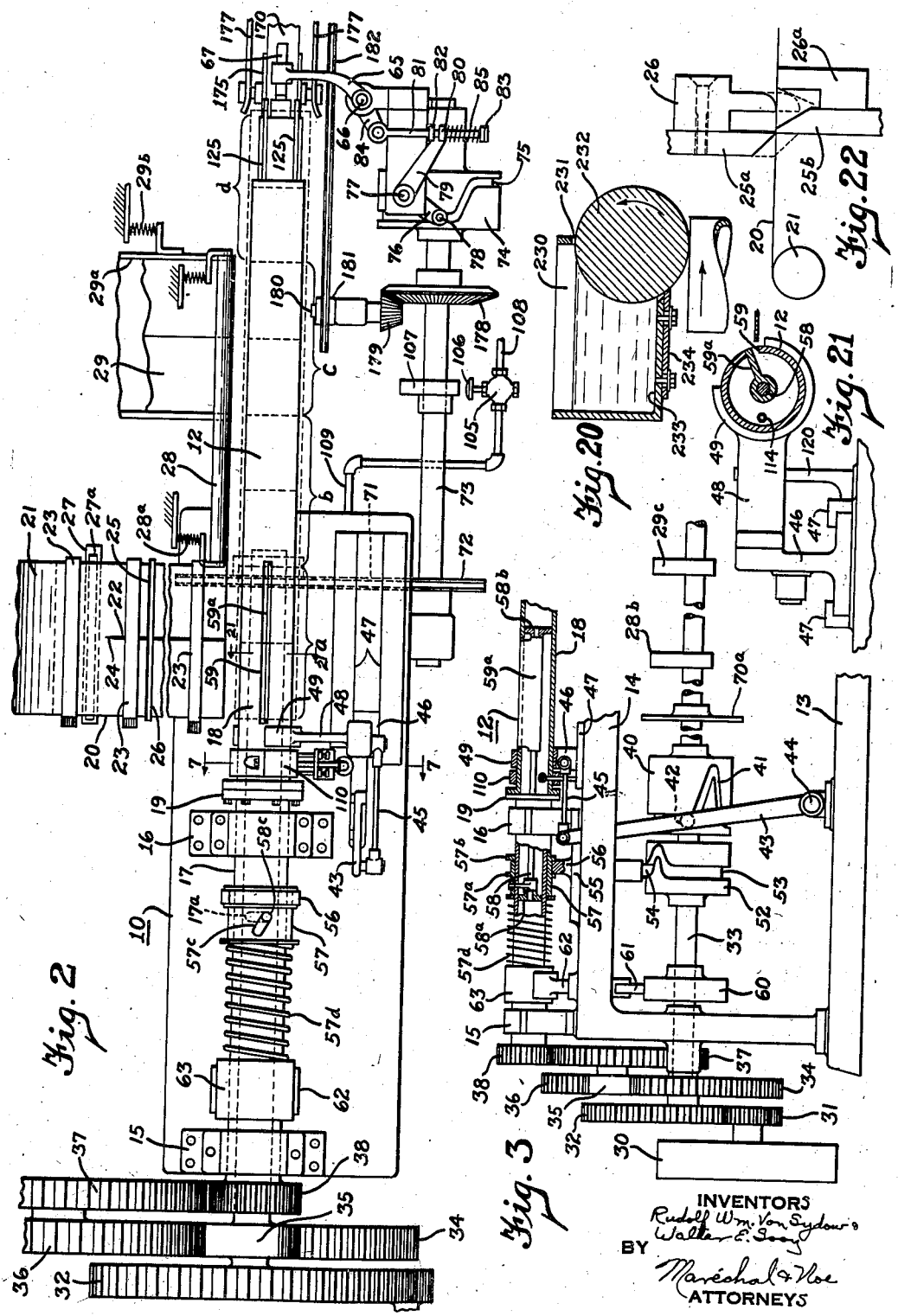

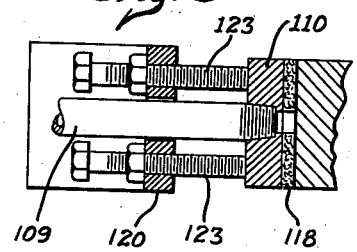
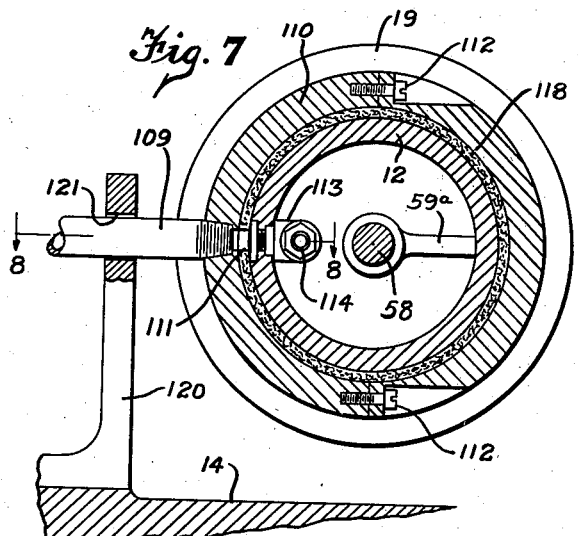
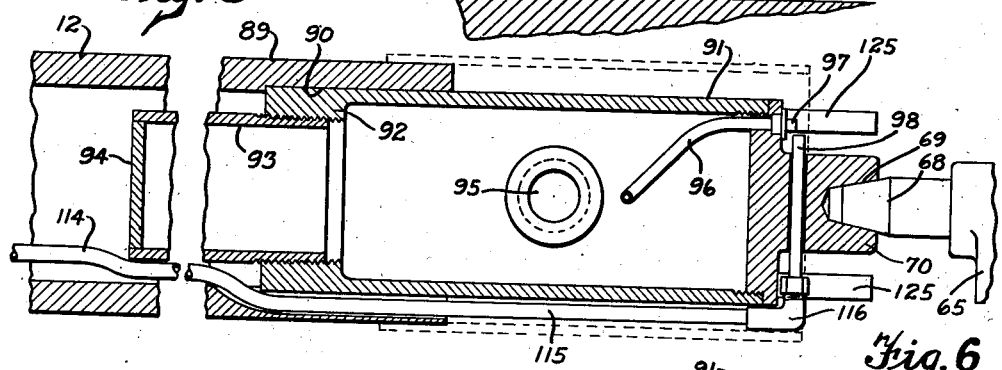
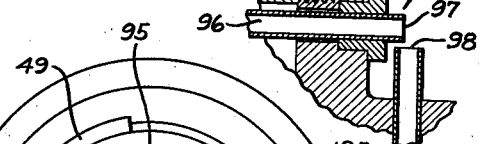
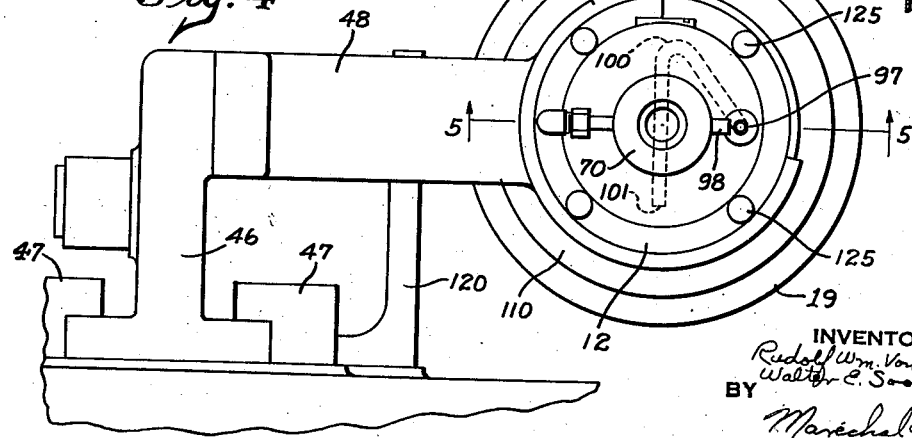

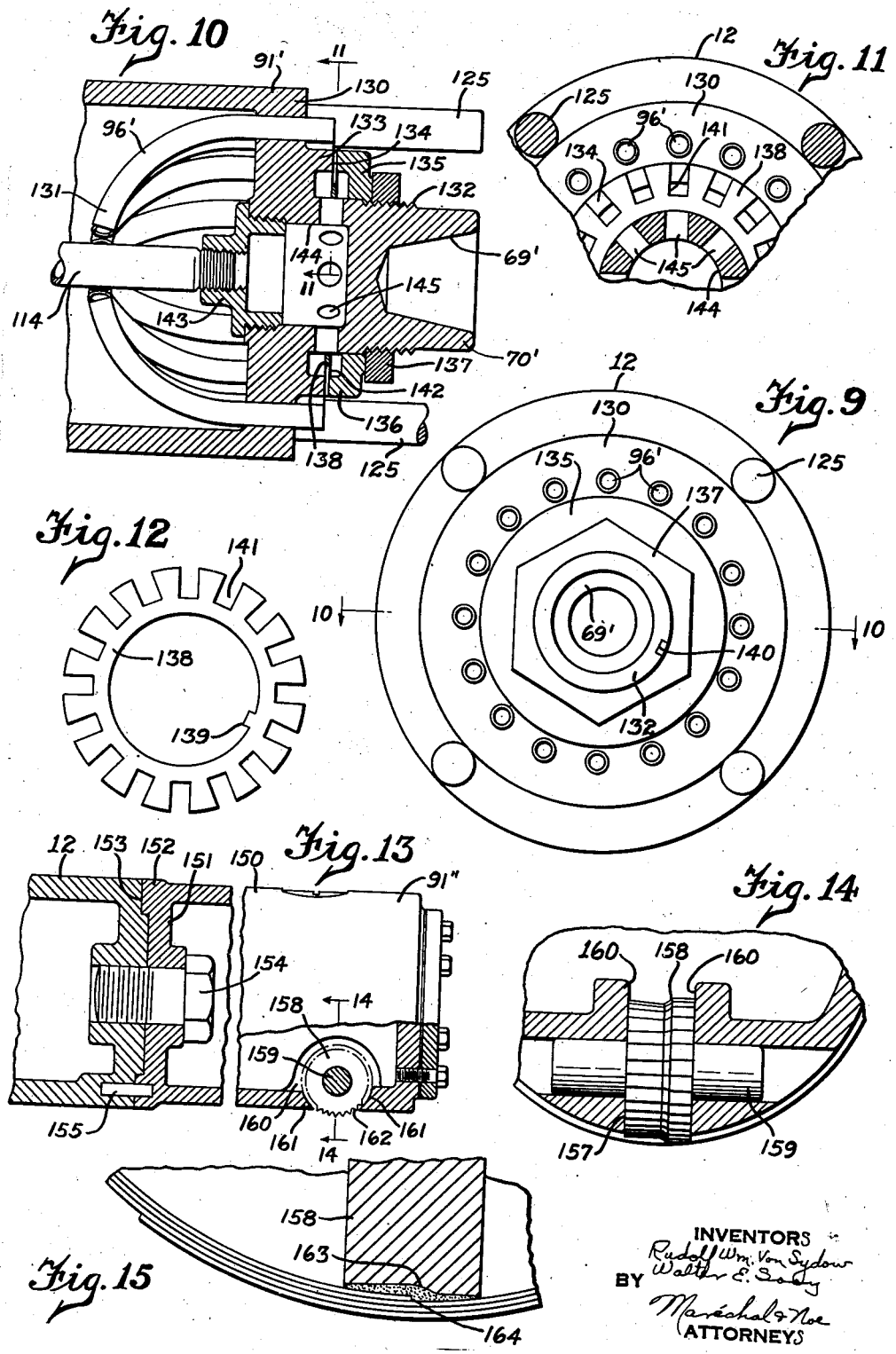

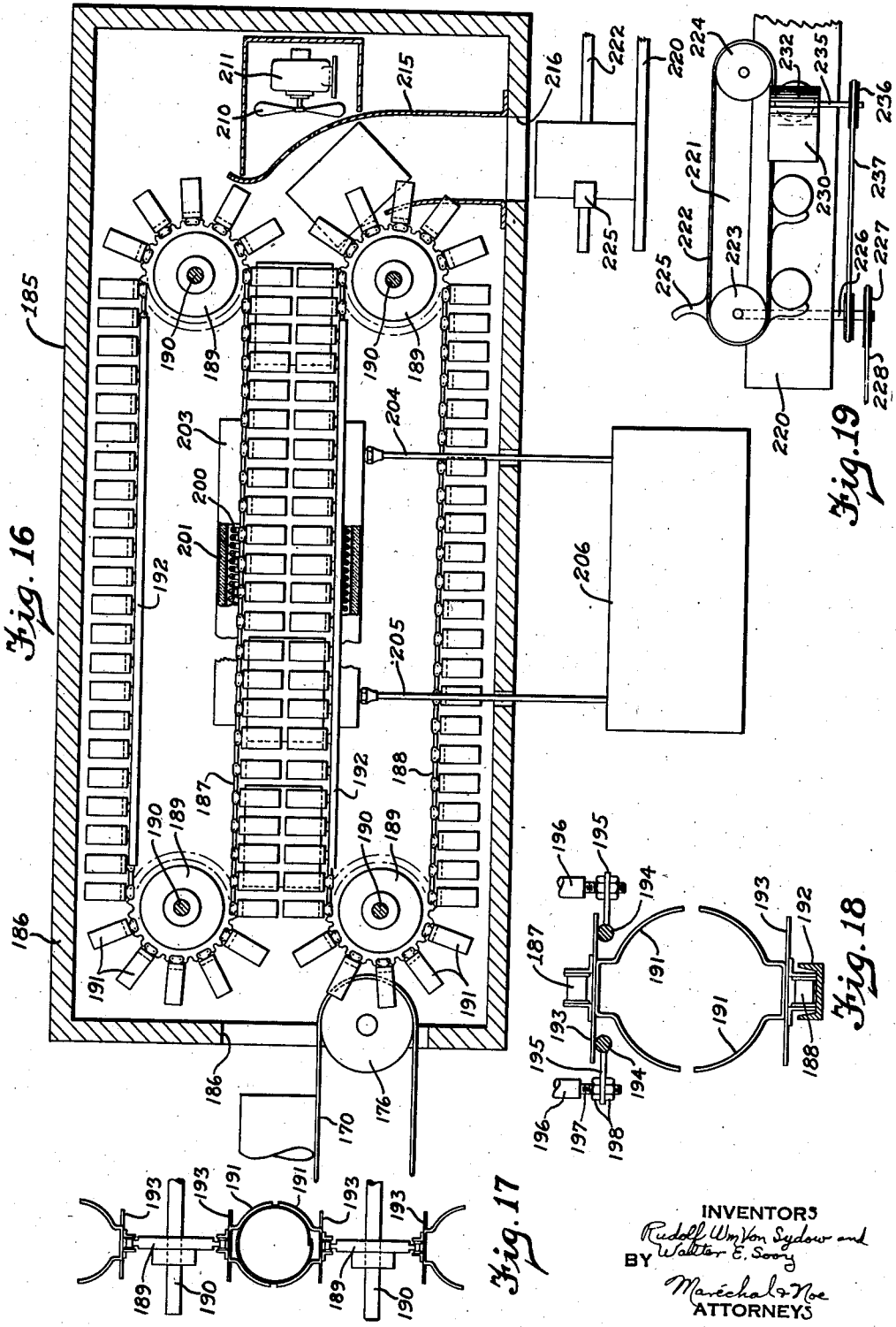

2,163,317

UNITED STATES PATENT OFFICE 2,163,317

PRODUCTION OF SEALED CONTAINERS

Rudolf William von Sydow and Walter E. Sooy, Middletown, Ohio, assignors to The Gardner-Richardson Company, Middletown, Ohio, a corporation of Ohio Application September 21, 1937, Serial No. 164,914

24 Claims. (Cl. 93—39.1)

This invention relates to containers made of paper or paperboard or other flexible material and to the complete production of such containers filled with contents and sealed.

It is a principal object of the invention to provide a complete process for forming containers from paper material or the like, filling the formed container with its contents, and applying and sealing the ends in place thereon to form a completely sealed filled container.

It is a further object to provide a process for quickly and effectively forming containers from paperboard material or the like in sheet or roll form, filling the formed containers with the desired contents, and sealing the container with the contents therein.

It is a further object to provide a complete continuous process for the manufacture of a paperboard container the interior surface of which when formed is completely impervious to oily and greasy substances.

It is a further object to provide a process particularly adapted for the formation of containers for oily or greasy substances in which a paper sheet material is made into a container having such surfacing on the interior as to make the formed container completely impervious to such substances to prevent escape of the contents thereof, and the formed container is filled and sealed as a part of one continuous process.

It is a further object to provide a process for forming containers in which a paper sheet material is wound into a container form and a coating of greaseproof material impervious to the passage of oil, grease, moisture and the like is applied to the interior of the formed container at the seam therein, and to provide such process as a part of a complete continuous system for forming the container bodies, applying the ends thereto in sealed greaseproof relation and filling the container with the desired contents.

It is a further object to provide a continuous process for the manufacture of containers for oily or greasy substances in which a web or sheet of paper material having grease-resisting surfacing thereon is wound into form for a container body wall, one end being applied and sealed in greaseproof relation to the body wall, the container then being filled with oil or the like, and finally the opposite end being similarly applied and sealed in greaseproof relation, providing a filled sealed container having an interior surface completely impervious to the contents of the container.

It is a further object to provide novel and highly efficient apparatus for carrying out the above methods.

Other objects and advantages of the present invention will be apparent from the following description, the accompanying drawings, and the appended claims.

In the drawings, which illustrate preferred embodiments of apparatus adapted to carry out the invention, and in which like reference characters designate like parts in the several views:

Figs. 1, 1a and 1b are elevational views each diagrammatically illustrating a complete operating structure embodying the invention, the several portions being associated in the complete structure in the manner shown by the broken lines;

Fig. 2 is a fragmentary plan view, partly diagrammatic, of a machine adapted to form the container body portions from the paper sheet material;

Fig. 3 is a fragmentary elevational view of a portion of Fig. 2;

Fig. 4 is a fragmentary view showing the winding mandrel in end elevation;

Fig. 5 is a fragmentary sectional view on the plane of the mandrel axis showing a seam sealing device at the discharge end thereof and as indicated by the line 5—5 on Fig. 4;

Fig. 6 is an enlarged fragmentary view of a portion of Fig. 5;

Fig. 7 is a sectional view as indicated at 7—7 on Fig. 2;

Fig. 8 is a fragmentary sectional view as indicated at 8—8 on Fig. 7;

Fig. 9 is a view taken similarly to Fig. 4 and showing a different arrangement of seam sealing device;

Fig. 10 is a sectional view as indicated at 10—10 on Fig. 9;

Fig. 11 is a fragmentary sectional view as indicated at 11—11 on Fig. 10;

Fig. 12 is an elevational showing of a spacing member;

Fig. 13 is a fragmentary elevational view, partly in section, of a mandrel discharge end illustrating another form of seam sealing device;

Fig. 14 is a fragmentary sectional view as indicated by the line 14—14 on Fig. 13;

Fig. 15 is an enlarged fragmentary sectional view taken similarly to Fig. 14;

Fig. 16 is a sectional elevation through a conditioning device for the formed container bodies;

Fig. 17 is an end elevational view of the conveyor mechanism contained within the conditioning device;

Fig. 18 is an enlarged detail view of a portion of the conveyor mechanism illustrated in Fig. 17 and illustrates a supporting and spacing means for such mechanism;

Fig. 19 is a plan view diagrammatic in character of a mechanism for advancing the body portions of the container past a device for applying a seal to the ends of the container bodies;

Fig. 20 is a sectional view through one of the end sealing devices; and

Fig. 21 is a detail sectional view on line 21—21 of Fig. 2 showing the forming mandrel rotated in the direction of operation and about to receive the entering web of paper.

Fig. 22 is a detail end elevational view showing the cut-off knife arrangement.

In accordance with the present invention a complete overall or streamline production system is provided for the complete manufacture of containers, starting from the body material, and continuing through to the filled and sealed container.

While not restricted to application in any one field, the invention is of particular importance in connection with the field of providing containers for the packaging of oily or greasy materials, such as lubricating oils, greases, paints and other analogous oleaginous materials as utilized either industrially or for food products. For purposes of illustration, the detailed description herein will be developed primarily in relation to the formation of containers adapted for the packaging of lubricating oils.

The invention relates primarily to the utilization of paper or paperboard material as the constituent for forming the containers body, which material may be supplied in any convenient manner, such as from a large jumbo roll, in sheet form or the like. Preferably the sheet or roll has a width sufficient to form a plurality of container bodies simultaneously, the web of paperboard material being slit and cut to proper size for each of the plurality of container bodies prior to the forming operation.

In the preferred practice of the invention the paperboard material while in sheet form and before being wound into a jumbo roll is provided with a suitable grease or oil resisting surfacing having such characteristics as to be capable of forming an impervious surface adapted to resist the penetration of the particular contents for which the container is built. Such surfacing preferably includes a composite coating including a lower layer having characteristics of flexibility and some resistance to penetration of oil and moisture, and an overlying coating comprising a layer primarily greaseproof in character, the composite coating maintaining its impervious character during the forming operation. Such coating may comprise a composition such as disclosed in Swan Patents 1,957,368, 1,957,369 and 2,039,361, or the coating may comprise a lower coating layer of plasticized glue having sufficient flexibility, and an overlying coating of cellulose compound such as nitrocellulose applied as an aqueous emulsion or as a solution in organic solvents.

Paper material, preferably having such surfacing thereon and cut to the required size, is supplied to forming means adapted to wind the sheets into the desired container form. A plurality of sheets are preferably wound simultaneously. Suitable adhesive is applied to the sheets prior to or during the winding operation to provide for securing the wound sheets in desired form, the adhesive if desired also having additional proofing characteristics resisting the penetration of grease, moisture or the like.

To provide an inner surface for the container which is completely impervious to seepage and wicking of the contents through the exposed edges of raw paper material which lie at the inner seam and ends of the container body, when formed, the invention provides means for applying a coating of suitable sealing material to such edges of the paper material. This sealing material is of such nature as to form with the surfacing on the paperboard an impervious and homogeneous greaseproof and moistureproof layer capable of drying quickly and completely. Very satisfactory results have been secured in this respect with a solution of a cellulose material (nitrocellulose) in organic solvents. Such material can be applied economically in a thin film, is readily controllable in its application, dries quickly, and forms an impervious and homogeneous surface with greaseproof board of the character described. The exposed edge which lies at the inside seam of the container body is preferably sealed in this manner after the container has been wound and as the formed container is being discharged from the forming operation. Where the containers are formed from paperboard or the like which has not been previously provided with a grease proof surfacing thereon, or which contains only the lower layer of a composite greaseproofing surfacing of the character described above, the invention provides means for applying a coating of the sealing material to the entire inside surface of the body as well as the seam at this point in the process. The sealing material is preferably applied to the end edges of the container body at or just prior to the application of the ends.

The container body, formed and adhesively secured together with the inside seam properly sealed, is passed automatically to a conditioning device for treating the formed container to secure proper setting thereof so that it will retain its proper shape. Thereafter one end is applied and sealed in place, the container is automatically passed to a filling machine which supplies the proper quantity of a desired filling material to the container and the filled container is then further automatically transferred to an additional mechanism which applies and seals the other end in place on the container. The most satisfactory results have been secured in the practicing of the invention through the use of metal ends of the customary type. As hereinabove pointed out the end edges of the container body are provided with a sealing material at or just prior to the application and sealing of the ends to form a luted joint completely and effectively closing the sealed container.

There is thus provided a highly effective and extremely efficient overall production mechanism by means of which the paper material in satisfactory form is taken in proper controlled dimensions, wound into container form, and the formed container then filled and sealed with the greatest facility and under high speed efficient operating conditions to provide a filled container the inside surfaces of which are entirely impervious to the material contained therein.

Referring to the drawings and more particularly to Figs. 2 and 3, the numeral 18 designates generally a tube forming machine upon which the tubular container bodies are wound. The form of machine here illustrated incorporates but a single rotatable mandrel which is designated generally by the numeral 12. The machine 10 comprises a base structure 13 upon which is mounted suitable frame structure 14 incorporating bearings 15 and 16 for the support and rotation of the mandrel 12, which, as shown, comprises two axially related parts that are separable to permit replacement of the part on which the container bodies are wound in order that container bodies of different contour may be fabricated on a single machine. That portion which is received by the bearings 15 and 16, and which is designated by the numeral 17, is not removable while the portion 18 to the right of the coupling flanges 19 (Fig. 2) is readily replaceable as desired.

The arrangement of the machine 10 is such that paper stock, designated generally by numeral 20, may be supplied to the mandrel for a winding operation to form the tubular body portions of the containers. This paper supply is preferably from a large supply roll 21 having a width which is a multiple of the height dimension of the container body portion. In the illustrated embodiment of the invention the paper strip 20 is of sufficient width to permit simultaneous winding of two adjacently related container bodies; the paper feeding mechanism being such as to supply the paper to the mandrel in adjacently related strips or ribbons that have been previously sheared and slotted to the proper width as indicated at 22 so that when wrapped each constitutes a separate container side wall. The mechanism for feeding, slotting and shearing the paper web is diagrammatically illustrated in Fig. 2 wherein the reference numerals 23 indicate geared feed rolls, the numeral 24 a slotting blade and the numeral 25 a shearing knife. The feed rolls 23 and the mechanism for operating the shearing knife 25 are interconnected by suitable means (not shown) to the driving means of the machine 10 to feed the paper to the winding mandrel and cut the paper strips to the desired length in proper timed relation to the winding operation. The paper strips are preferably cut to such length that the container wall when wound comprises a plurality of complete layers plus an overlap as shown in Fig. 15. In the preferred manner of practicing the invention a container body comprising three layers with a substantial overlap is formed. The shearing knife is so arranged as to effect the bending of the trailing edge of the paper web, thereby overcoming its tendency to spring away from the wall of the formed container, and making it easier to adhesively secure even a relatively stiff paper or like material in wound form. For this purpose the upper and movable knife 25a, as shown in Fig. 22, carries a presser member 26 which extends across its face and is spaced from the stationary knife blade 25b, the latter being suitably bevelled as shown. The blade 25b carries a fixed support 26a, spaced therefrom, over which the sheared end of the sheet is bent, the knife 25a moving beyond the point of cut-off and into the dotted line position shown for this purpose.

A means for applying an adhesive to the paper web for the purpose of securing the wound layers of the formed container together is also diagrammatically shown in Fig. 2 wherein the reference numeral 27 indicates generally a glue pot and the numeral 27a a suitable roller or the like for applying the adhesive.

As shown, the mandrel 12 is of materially greater length than the width of the paper supply strip 20 so that successive operations may be performed in the container bodies at laterally spaced points by repeated advance of the wound cylinders on the mandrel. Before referring in particular detail to the various operating parts of the mandrel structure it is pointed out that the mandrel alternately rotates and dwells and upon completion of the winding operation the two container body portions that have been initially formed on the mandrel at the station designated by a are, during the following dwell interval, advanced axially of the mandrel to the next adjacent operating station wherein the tubes are further treated to more effectively seal the adjacent wrapped layers. This station, designated by b carries suitable pressure means such as the roller 28 which is adapted, during the operating cycle of the machine, to press against the container body portions at this station during mandrel rotation to insure proper adherence of the adhesive treated layers.

Following the next operating cycle of the mandrel the container body portions are advanced to a station c where labels are applied to the exterior thereof. The label feeding and applying mechanism and its operation are indicated by a diagrammatic showing at 29 of label stock standing in position for application.

The roll 28 extends across both the b and c stations and is suitably mounted on pivotal supports, spring means 28a providing for resiliently urging the roll into pressing contact with the glued outer surface of the formed tube in station b and the outer label surface in station c to iron and smooth the same. The labels 29 are carried in an adjustably mounted frame or hopper 29a beneath the mandrel and are arranged to be brought into contact with the surface of the mandrel by spring means 29b to cause the picking up and winding of the label onto the outside of the container body. Cams 28b and 29c on shaft 33 provide respectively for releasing ironing roller 28 and label stock 29 from their operative positions adjacent the mandrel to inoperative positions clear thereof to provide for stripping, the cams also providing for engagement thereof at the proper time.

Following the next succeeding operating cycle of the mandrel the container bodies are advanced to a station d which brings the wound paper tubes adjacent the discharge end of the mandrel. This last mentioned position is, in the present embodiment of the invention, a position in which no further processing takes place during subsequent rotation. The next successive advance of the container bodies causes them to be ejected from the mandrel.

In the preferred practice of the invention it is during the operation of discharge of the containers from the mandrel that the container body interiors are treated to effect a sealing of the tube wall so as to render that portion of the container completely impervious to the passage of the container contents.

Having briefly covered the general arrangement and operation of the mandrel, the various portions of the machine that contribute to the operating cycle and which are associated with the performance of the sealing operation are now taken up in greater detail. Referring now to the intermittent drive movement of the mandrel, and more particularly to the application of power to the machine; the drive pulley 30 has fixed to it a pinion 31 that meshes with a gear 32 which is fixedly mounted upon a long shaft 33 which, as shown, carries various cams for operating different parts of the machine. The shaft 33 also has fixed thereto a gear 34, which, as indicated at 35, is of the form known as a mutilated gear having a blank area thereon without teeth which permits a dwell in a mating gear with which it meshes. The driven gear 36 that meshes with the mutilated driving gear 35 has fixed to it a gear 37 which meshes with a gear 38 that is part of and is fixed to the mandrel assembly. The relationship of the various gears constituting the above described gear train is such that a proper number of winding turns is imparted to the mandrel 12 for formation of the tubular container body, and a suitable dwell interval is provided upon termination of the winding to permit of operation of the various control parts of the machine for advance of the container bodies along the mandrel, etc., during each complete revolution of the continuously rotating shaft 33.

The shaft 33 carries a barrel cam 40 which serves to operate the mechanism by which the container bodies are advanced from one station to another. As shown, the cam 40 has on the peripheral face thereof a cam track 41 which is engaged by the cam roller 42 of an arm 43 that is pivotally mounted at 44 on the machine base 13. The upper end of the arm 43 has pivotally connected to it a link 45 that connects to a slide block 46 that is carried in ways 47 for reciprocating travel in accordance with the movement of the arm 43. Slide block 46 has fixed thereto a lateral extending arm 48 that terminates in a yoke-shaped member 49 that partially surrounds and closely fits the mandrel 12. As shown, particularly in Fig. 4, the yoke-like part 49 extends for substantially 270° of the mandrel surface and provides a suitable engaging face that functions to axially move the container bodies; the amounts of movement being substantially the same as the axial dimension of the two wound tubes and such that the tubes are advanced an amount sufficient to clear the station *a* for the next succeeding tube winding operation. The contour of the cam track 41 is such that full reciprocating movement of the tube advancing means occurs during the dwell interval of the mandrel.

The continuously rotating shaft 33 likewise includes control means for actuation of the gripper by which the entering end of the paper strip is held to the mandrel for initial winding. As shown, a barrel cam 52 is provided having a cam track 53 therein that is engaged by a roller 54 carried by a slide block 55 which terminates at its upper end in a yoke-shaped member 56. The yoke member 56 is received between the outturned flanges 57a and 57b of a sleeve 57 axially slidable upon the portion 17 of the mandrel. The sleeve 57 is provided with a slot 57c which is inclined with respect to the axis of the mandrel. The portions 17 and 18 of the mandrel are hollow as shown, and an axial rock shaft 58 extends within the hollow interior from a point to the left of slot 57c to a point to the right of winding station *a* as viewed in Figs. 2 and 3. Suitable bearings 58a and 58b support the ends of rock shaft 58. A pin 58c is rigidly attached to rock shaft 58 and extends through a transversely slotted opening 17a in the mandrel portion 17 and is received within the slot 57c of sleeve 57. From the above it is evident that axial movement of sleeve 57 in response to cam 52 causes a rocking movement of rock shaft 58. The mandrel portion 18 is provided with an axial slot 59 which extends along the entire width of the winding station *a* and has a length somewhat greater than the width of the paper web 20. A gripping member 59a is rigidly attached to rock shaft 58 and extends into the slot 59 of the mandrel. The gripper 59a extends along substantially the entire length of the slot 59 and has a thickness less than the width of the slot whereby the gripping member may be moved from one side of the slot to the other upon rocking of rock shaft 58 by cam 52. The slot 59 is so positioned on the mandrel that during the dwell interval of the mandrel the slot lies substantially medial of the side of the mandrel towards which the paper stock is fed and the paper web is fed to the mandrel along a plane that is in radial alignment with the slot opening. The shape of the cam track is such that at the beginning of the dwell interval the gripper 59a is positioned against the upper side of the slot 59 to provide an opening between the under side of the gripper and the lower side of the slot into which the forward edge of the paper material is fed. In proper timed relationship to the feeding operation the cam 52 rocks the gripper towards the opposite side of the slot to securely clamp the forward edge of the paper material between the gripper and slot side during the initial winding operation. A tension spring 57d urges the sleeve 57 towards the paper gripping position to assure firm gripping of the paper material.

A braking device is provided that functions to stop the mandrel in a predetermined position at the end of the winding part of the cycle. As shown, the continuously rotating shaft 33 carries a cam 60 which is engaged by a roller 61 that is carried by a brake shoe 62 that is adapted, upon lifting movement of the roller 61, to engage a cylindrical braking surface 63 on the mandrel 12. The angular extent of the lift of the cam 60 is such that the mandrel is securely held in proper positioning during the dwell interval.

As mentioned above, the mandrel is supported for rotational movements within bearings 15 and 16. These bearings are rather closely spaced and stand adjacent the driving end of the mandrel. Additional support is provided for the mandrel at the opposite end through the medium of an arm 65 which has provision for axial engagement with a socket formed on the mandrel end. As shown, the arm 65 is mounted upon the upper end of a rock shaft 66 that is adapted to swing the arm from a position of engagement with the mandrel to a clearance position that is removed from the mandrel an amount sufficient to permit removal of the completed container bodies therefrom. The outer end of the arm 65 has adjustably mounted therein a transverse bar 67 which terminates, as shown in Fig. 5, in a conical end portion 68 that is received within the socket 69 of an axial projection 70 on the mandrel end.

During the interval that the mandrel is in rotation it is supported as indicated in Fig. 2. During the dwell interval the arm 65 is carried to a removed position through provision of operating structure having connection with the continuously rotating shaft 33. As shown, the shaft 33 has mounted thereon a sprocket 70a over which runs a chain 71 connected to a sprocket 72 on the rotatable shaft 73 which has fixed thereto a barrel cam 74 upon which is formed a cam track 75. A crank 76 is attached to the lower end of a rock shaft 77 and has fixed to its other end a roller 78 which rides within the cam track 75 and causes angular travel of the crank in accordance with the course of the cam track. An arm 79 is attached to the upper end of rock shaft 77 and has pivotally mounted thereon an eye 80 that is slidably movable between a pair of collars 82 and 83 carried by a rod 81 that is pivotally carried from an arm 84 attached to the lower end of the rock shaft 66. A tensioned spring 85 is positioned between the eye 80 and collar 83 fixed to the end of the rod 81. The shape of the cam track 75 is such as to cause the eye 80 of arm 79 to move against the collar 82 at the beginning of the dwell period to swing the arm 65 away from the mandrel end into the clearance position and to hold it in the clearance position during the dwell interval. At the end of the dwell period the cam 74 returns the arm 79 and eye 80 to the position shown in Fig. 2 which causes the arm 65 to swing into engaging position with the mandrel end by means of the flexible connection between eye 80 and the collar 83 fixed to the rod 81. The proportioning of the parts is such that when the arm 65 is returned to engaging position the eye 80 is spaced from the collar 82, as shown in Fig. 2, whereby arm 65 is yieldingly held in engagement under the tension of the spring 85 to effectively support and position the mandrel end.

As mentioned above, in the preferred practice of the invention the container bodies are wound from a paper stock which has been provided with a greaseproof coating or surfacing of the character hereinabove described while in sheet form and before it is wound into the jumbo roll. The containers are wound with such surfacing on the interior and the sheared raw edge of the inner seam is the only exposed portion of the innerface at which seepage or wicking of the container contents may occur. In Figs. 4 to 6 of the drawings there is illustrated a means for effectively rendering such raw edge and the inner seam impervious to the passage of the container contents as the container body is passed from the end of the forming mandrel. In this form of the invention a single spray jet is provided to direct a flow of the sealing material of the character described above in a relatively narrow strip or band against that portion of the container interior which includes the inner seam.

The sealing material is supplied from a container that is provided at the discharge end of the mandrel and its flow is controlled by operating means that function during the dwell portion of the mandrel cycle. Referring now to the container for the sealing material, the mandrel is constructed of uniform diameter throughout the major portion thereof which includes the several operating stations and continues as such for some distance into the last dwell station $d$. This portion of the mandrel, indicated by the numeral 89, is tubular and terminates at the outer end in an annular recess or counterbore as indicated at 90 (Fig. 5). This recess or counterbore serves to receive a tank structure 91 which, as shown, continues exteriorly of the mandrel end to approximately the limit of the station designated $d$. The tank 91, which is cylindrical in cross section, is somewhat smaller in diameter than the mandrel portion 89 and is arranged to hold sufficient of the sealing substance to permit of continued operation for an extended time without necessitating a refilling. As shown, the inner or telescoped end of the tank, designated by the numeral 92, has threadedly received therein a tubular part 93 which may extend within the main mandrel part for a desired distance; the part 93 terminating in an end wall 94 which defines the inner limits of the container.

Fluid is introduced to the tank through provision of a filling opening 95. It is withdrawn from the tank through a pipe 96 the inner end of which is arranged to withdraw fluid from the supply and the outer end, indicated at 97, stands in operating relationship with the terminal end of an air nozzle 98 which is connectable to a source of air under pressure so that upon movement of an air blast across the pipe end 97 an aspirating action obtains which results in a spray of sealing solution. As shown, the tube 98 which directs the air blast stands transversely of the mandrel axis and is positioned to direct the spray normally of the container wall. The positioning of the fluid opening 97 and the air spray opening in nozzle 98 corresponds angularly to the position of the inner seam which is determined by the position of the gripping device on the mandrel whereby the paper supply is initially held during the winding operation. As the annular relationship between gripper and spray device is fixed a proper positioning of the spray on the container walls is assured.

Effective fluid flow obtains by forming the withdrawal tube 96 so that its inner end stands beneath the fluid level during the dwell interval of the mandrel and so that fluid flow through the tube is prevented during mandrel rotation. As shown, that portion of the tube 96 within the tank 91 extends diagonally upwardly from the discharge portion 97 to a position closely adjacent the tank wall as indicated at 100 from which the tube bends downwardly and extends to substantially a diametrically opposite position, terminating at 101 closely adjacent the tank wall.

The supply of pressure air to the nozzle 98 is controlled so that the spray exists during the mandrel dwell intervals in which the container bodies are stripped from the mandrel. In the illustrated embodiment of the invention this is accomplished by actuation of a valve 105 through movement of the shaft 73. The valve 105 is included in an air supply line that extends into the mandrel adjacent the coupling 19 (Fig. 2) and extends within the mandrel along the interior thereof terminating at the nozzle 98. As shown, the valve 105, which is of the type generally referred to as a whistle valve, has an axially movable plunger 106 that is adapted to be engaged by a cam 107 on shaft 73. The valve has connection through a pipe 108 to a source of air under pressure and has extending therefrom a pipe 109 which terminates in a ring-like fitting 110 which closely surrounds the mandrel and has provision therein for conveying the air flow to the mandrel interior.

As shown more particularly in Fig. 7, the pipe 109 terminates in threaded engagement with the fitting 110 which has an opening 111 extending in continuation of the pipe 109 and provides a passage through the fitting. The mandrel 12 has an opening therein, which, in the dwell position, stands in registration with the opening of the fitting. The relationship between these parts and the cam 107 is such that at the proper coordinated time in the cycle, the mandrel stops with the mandrel opening in alignment with connection 109, and as the stripping operation commences cam 107 actuates valve 105 to effect application of the sealing material to the interior seam. As shown, the air flow into the mandrel is through the medium of an elbow fitting 113 which has connection with a tube 114 that extends axially within that portion of the mandrel of large diameter and continues beyond the large mandrel end as indicated at 115; this part terminating in an elbow 116 into which the transverse nozzle portion 98 is fitted. Suitable sealing engagement between the fitting 110 and the mandrel is effected by constructing the fitting 110 to accommodate a layer of suitable sealing materials such, for example, as leather which is indicated at 118. The fitting 110 is so constructed that when assembled with the clamping screws 112 drawn tight the leather packing is closely held between the interior of the fitting 110 and the face of the mandrel. Additional pressure may be applied to further restrain leakage through provision of a clamping device that is carried by the angle bracket 120 that stands upwardly from the machine frame 14 opposite the fitting 110. As shown in Figs. 7 and 8 the bracket 120 has an opening 121 therethrough for passage of the pipe 109. This interfitting of parts serves to restrain any turning tendency on the part of the fitting 110 and thus functions to maintain the fitting opening in a fixed position to afford effective registration with the mandrel opening in the dwell position thereof. The bracket 120 also has in threaded engagement therewith cap screws 123 which are positioned on opposite sides of the pipe 109 and which may be advanced into forcing engagement with the outer face of the fitting 110. Adjustment of the screws 123 enables the fitting to be held against the mandrel with a desired pressure to effectively prevent leakage.

In order to maintain a proper positioning of the container bodies after leaving that portion of the mandrel of large diameter and prior to passage beyond the point of application of the sprays, the mandrel is arranged with angularly spaced axially extending rods 125 which are shown as being four in number and of such diameter that the peripheries thereof stand in continuation of the mandrel large diameter. The rods 125 extend axially at least as far as the spraying position and thus serve to effectively prevent displacement of the containers.

When the containers are formed from a paper stock that does not have a treated inner surface to prevent seepage of the container contents thereinto, or which contains only a lower surfacing layer of a composite greaseproofing surfacing as described above, a form of spraying device may be utilized which provides for the application of the greaseproofing surfacing material to effectively cover the entire inner face of the formed container bodies in addition to the inner seam. Such a form of spraying device is illustrated particularly in Figs. 9 to 12 wherein a tank 91' is provided on the mandrel end and is illustrated having a plurality of fluid outlet pipes 96'. As shown, the fluid outlet pipes 96' extend through the tank end wall 130 in a direction parallel to the mandrel axis and are arranged in a circle of equal angular spacing; the illustrated embodiment of the invention showing sixteen of these discharge pipes of which the ends within the tank are curved inwardly toward the mandrel axis and terminate closely adjacent the axis as indicated at 131.

The end portion 130 of the tank is arranged so that an air blast may be directed over each of the pipe ends and an effective continuous spray is thus afforded for the entire container inner surface. The construction of the tank end is such that the intensity of the air blasts directed toward the fluid outlets may be varied in degree as desired. As shown, the tank end has an axially extending portion 132 which terminates in a part 70' having a conical socket 69' for reception of a mandrel end supporting member 68. The tank end 130 is also formed with an annular flange 133 terminating in a flat face 134 that is transverse to the mandrel axis. A ring 135 having a laterally turned peripheral flange 136 is slidably receivable upon the projecting end part 132; the parts 133 and 136 being of similar configuration and extending oppositely to define a ring like nozzle opening. As shown, the ring is held in position through provision of a locking nut 137. A washer 138 is adapted to be received between the parts 133 and 136 and is constructed with peripheral slots corresponding in positioning and number to the fluid outlet pipes. As shown, the washer 138 has an outside diameter corresponding to the diameter of the flange parts 133 and 136 and an inside diameter such that it is slidably receivable on the axially extending portion 132. An assured positioning obtains by provision of a lug 139 on this washer that is receivable within a notch 140 provided on the tank end 132. The peripheral notches 141 of washer 138 have a radial depth in excess of the thickness of the flanges 134 and 136 as shown in Figs. 10 and 11 so that a discharge opening is provided from the area 142 enclosed by the flanges 133 and 136. Pressure air is supplied to the enclosed area 142 from the supply pipe 114' through the medium of the threaded fitting 143 that serves as a closure for the axial passage 144 that has angularly spaced openings 145 effecting communication with the nozzle area 142.

The intensity of the air blast may be altered by substitution of a nozzle washer 138 of different thickness. This is readily accomplished because the washer is a relatively simple part that may be produced in varying thicknesses at no great cost, and may be substituted by merely removing the ring 136 and nut 137.

The sealing of the inner seam may be accomplished by the direct application of sealing solution to the surface of the container without utilizing an airblast as the medium for application. Referring now more particularly to Figs. 13 to 15, the mandrel is shown as having a tank structure 91'' removably attached to the discharge end thereof. As shown, the tank 91'' comprises a cylindrical side wall 150 having a diameter slightly less than that of the main portion of the mandrel. The inner end of the tank terminates in a transverse wall 151 having an annular flange 152 that cooperates with a mating annular recess 153 on the mandrel end. The mandrel end and tank end wall are arranged to receive attaching means shown in the form of a cap screw 154 of which the head stands within the tank and the stem portion threadedly engages the mandrel end. A proper positioning of the tank obtains through provision of a pin 155 which defines the angular positioning of the sealing mechanism of the tank with respect to the paper engaging gripper of the mandrel so that the inner seam of the containers will traverse the sealing mechanism of the tank.

The tank side wall 150 has formed therein an axially extending slot 157 within which is received a free turning roller 158 having an axle pin 159 journalled within the tank wall as shown. The roller proportioning and positioning is such that the peripheral face stands at substantially the projected surface of that portion of the mandrel on which the container bodies are carried; this positioning causing the roller to engage the container bodies as they are ejected from the mandrel. Rotation of the roller carries sealing solution from within the tank and applies it to the container surface in engagement with the roller. To prevent excess escape of the sealing fluid the roller is closely received within the two parallel side walls 160 that define the roller slot 157. The curved end walls 161 of the roller slot also closely engage the roller to prevent loss of fluid. It is pointed out, however, that some fluid is withdrawn on the roller face by arranging the roller face as a serrated surface as indicated at 162. As shown, the serrations 162 extend axially on the roller and have a saw-toothed contour, which, in effect, function as pockets within which the solution is withdrawn through the close fitting tank opening at the roller. In addition, the contour of the roller face is such that the solution is effectively applied to the seam so that a proper depth of solution will be placed directly over the exposed edge of the seam. Although the nature of the application is such that the sealing fluid is not supplied in a stream of uniform volume the substance is of such fluidity that the uneven quantities supplied from the roller serrations do smooth out and form a uniform application prior to hardening. As shown, particularly in Fig. 15, the roller face has an annular depression 163 which causes an excess of solution to be applied directly over the inner seam which is indicated by the numeral 164. It is pointed out that when using a sealing device of the character just described it is desirable to have the dwell interval of the mandrel take place when the inner seam stands downward so that even if fluid is applied in sufficient quantity to form a pool on the container seam the application will, because of gravity, be maintained in place.

The containers are discharged from the mandrel immediately following the application of the sealing solution and are picked up by a moving conveyor 170. Referring to Figs. 1 and 2, the conveyor 170 is shown as comprising an endless belt which is supported on spaced pulleys 175 and 176. The pulley 175 stands directly below the mandrel end. Parallel spaced guide rails 177 on the conveyor serve to maintain the cans thereon during traverse of this part of the structure. The conveyor 170 is driven by an interconnection with the common power source for the machine 10. As shown in Fig. 2 the continuously rotating shaft 73 has mounted thereon a bevelled gear 178 which has meshing engagement with a pinion 179 that is fixed to a rotatable shaft 180 carrying a sprocket 181. The sprocket 181 drives a chain 182 which is adapted to drive a sprocket (not shown) attached to the shaft carrying the pulley 176 of the conveyor 170. The conveyor 170 is preferably operated at substantially three times the speed at which the container bodies are discharged from the mandrel 12 to provide suitable spacing between the container bodies as they are discharged from the mandrel.

The conveyor 170 feeds the container bodies to a conditioning device 185 wherein the adhesive securing the body portions together is permitted to set under controlled temperature conditions while the body is maintained in the desired shape. As shown in Figs. 16 to 18, the conditioner 185 comprises an elongated housing 186 within which are mounted a pair of spaced parallel conveyor chains 187 and 188. The conveyor chains 187 and 188 are carried by sprockets 189 attached to shafts 190. Each of the chains 187 and 188 has attached thereto a plurality of clamping arms 191 which are adapted to grip the container bodies between cooperating arms carried by the lower reach of the upper chain 187 and the upper reach of the lower chain 188 and move the container body through the conditioning apparatus. The container bodies are delivered to the conveyor clamping arms 191 through an opening 186' provided in one end of the housing 186. The pulley 176 of the conveyor 170 is so arranged in this opening that the arms 191 pick up the container as it is advanced by the conveyor 170. As best shown in Fig. 17 the shape of the arms 191 and the spacing between the chains 187 and 188 is such that the cooperating upper and lower arms snugly engage the exterior surface of the container body portion around substantially its entire periphery to hold the body portions in their proper shape during transit through the conditioning apparatus. The clamping arms are so spaced on the conveyor chains 187 and 188 that a plurality of cooperating arms engage each of the container bodies to hold the shape of the body throughout substantially its entire length.

The upper reaches of the respective conveyor chains are adapted to ride within channel members 192 which provide a support for the chain and arms carried thereby intermediate the sprockets 189. For the purpose of supporting the lower reaches of the conveyor chains and preventing sag therein intermediate the sprockets 189 a bar 193 is attached to each of the arms 191 adjacent its connection to the conveyor chain. The bars 193 extend transversely outward beyond opposite sides of the conveyor chain and, as shown in Fig. 18, are adapted to slide on guide rods 194 extending longitudinally of the housing 186 adjacent the lower reaches of the respective conveyor chains. The guide rods 194 are carried by horizontal arms 195 which extend transversely of the chain and are attached to vertically extending rods 196. The rods 196 are spaced sufficiently far apart to permit the gripper arms 191 to pass therebetween upon operation of the conveyor. The transverse bars 193, guide rods 194 and channel 192 provide the proper spacing between the portions of the conveyor chains which clamp the container bodies and hold them in the desired shape during transit through the conditioner. To provide a means for adjusting this spacing the hangers 196 supporting the lower reach of the upper chain are provided with a screw threaded portion 197 on the lower ends and the arms 195 are attached to such threaded portion by means of the nuts 198.

As hereinabove stated the container bodies during the conditioning treatment are subjected to a controlled temperature condition to accelerate the setting of the adhesive. For this purpose a fluid conducting coil 200 is arranged to surround the container during its passage through the conditioner. The coil 200 is enclosed by a layer of insulating material 201 supported within a shield member 203. Pipes 204 and 205 connect the opposite ends of coil 200 to a temperature control unit 206 adapted to circulate fluid at the desired temperature through the coil. Generally it will be preferable to circulate a cooling fluid through the coil 200 but the unit 206 may comprise either a heating or cooling unit.

A fan 210 driven by an adjustable speed motor 211 is provided at one end of the housing 186 to blow a current of air over the containers during the conditioning treatment. The container bodies are preferably moved through the conditioner at substantially the same speed as the bodies are ejected from the forming mandrel 12. For this purpose conveyor chains 187 and 188 are preferably driven by suitable mechanism (not shown) interconnecting with the chain 182 driven by the common power source for the machine 10.

The container bodies are discharged at the far end of the conditioning device into a downwardly directed funnel 215 from which they fall by gravity through an opening 216 provided in the bottom of the housing 186. The container bodies upon discharge from the conditioning device 185 are received in upstanding relation upon a table 220 of a conveying device 221.

As shown in Fig. 19 the conveyor 221 comprises an endless belt 222 carried by the pulleys 223 and 224. A plurality of spaced arms 225 are carried by the belt 222 and are adapted to engage the containers after discharge from the conditioner to move the containers along the table 220. The pulley 223 has a geared intertable connection with a shaft 226 carrying a sprocket 227. A chain 228 runs over the sprocket 227 and has a driving interconnection with the driving chain 182. The arms 225 are so positioned on the belt 222 and the speed of the belt is so coordinated to the operation of the conditioning device that an arm engages each container body on the table 220 and moves it out of the way along the table before the following container body is discharged from the conditioner. Thus as the first of a pair of container bodies formed in one operating cycle of the mandrel 12 is discharged onto the table 220 an arm 225 is ready to advance it along the table before the second body of the pair is discharged from the conditioner. A second arm 225 picks up the second container body and advances it from beneath the opening 216 in the conditioner before the first container of the pair formed during the next operating cycle of the mandrel is discharged.

The container bodies are advanced by the conveyor 221 beneath a tank 230 which carries a supply of sealing solution and which has provision therein for effectively coating the uppermost container end. The sealing solution contained in tank 230 is of such characteristics as to close the ends of the body walls and to fill up any spaces between the wall and the end member, preventing seepage of the contents around the end and into the wall. It preferably comprises a suitable solution of cellulose compound such as described above. As shown in Fig. 20, the tank 230 has a partially open end wall 231 which closely receives a roller 232 that is journalled within hub portions formed on the tank walls. The tank bottom wall 233 has attached therebeneath a slidably adjustable gate 234 which may be moved to a desired clearance position with respect to the periphery of the roller 232 and which therefore functions as a gage in determining the amount of fluid withdrawn on the face of the roller as it rotates. The tank positioning is such that the roller stands at an elevation to contact the container ends as they pass therebeneath on the conveyor.

The roller 232 is positively driven at a speed and in a direction to give an effective application of sealing solution and is coordinated with the movements of the various other conveyor parts by a driving inter-connection with the common power source. As shown in Fig. 19 the shaft 235 which carries the roller 232 is provided with a pulley 236 which is connected with a pulley on shaft 226 by a belt or the like 237. The direction of rotation of the sealing roller 232 is such that it turns in the same direction as the movement of the container bodies thereunderneath. Its peripheral speed is preferably coordinated to the travel of the container bodies.

Having applied the sealing material to one container end the containers continue to advance by means of the conveyor 221 to a point where they are transferred to another conveyor which is indicated generally by the numeral 240 and which comprises a travelling belt 241 that serves to present the container bodies to a machine 245 wherein the first end closure is applied. A stack of sheet metal closure blanks is indicated at 246, and one of these blanks is applied to the upper end of each container body and securely crimped in position thereon by the machine 245 to provide a sealed, luted, greaseproof end closure for the container. The machine 245 is a conventional type of end closure applying machine, well known in the industry, such for example as that shown in Patent No. 1,805,288 dated May 12, 1931, issued to E. W. Bliss Company, and since the structural features of such machine are well known a detailed description thereof has been omitted. The conveyor 240 and machine 245 are operated in coordinated time relationship to the preceding steps of the process by suitable drive means, which are coordinated to the drive means for the apparatus heretofore described so that each container body is delivered to the machine 245 in proper time sequence for application of its end closure.

Upon leaving the end closure applying machine 245 the containers are further advanced by conveying means 250 for additional processing. As is indicated diagrammatically in Fig. 1, the container bodies during transit on the conveyor 250 are inverted at station 251 so that the closed end of the container bodies is turned downwardly thus exposing the opposite open end thereof. The conveyor 250 and inverting device 251 are driven by suitable means in coordinated time relationship to the discharge of the containers from the end closure applying machine 245. In this turned position the container bodies are passed by conveyor 265, similar to conveyor 221 and coordinated in movement thereto and to the discharge of the containers from the inverter 251 and conveyor 250, beneath another end sealing tank 270. The sealing tank 270 is similar in general respects to the tank 230 described above, and like that tank, is provided with suitable drive means for the roller which is coordinated to the movement of the container under the roller in the manner there described.

The conveyor 265 transfers the containers to a filling machine of conventional design indicated generally by the numeral 275. After being filled the containers are further advanced by provision of a conveyor 280 and are brought within the operating range of a second end closure applying machine 285 which applies a closure to the open end of the filled container from a stack of blanks 286 to provide a closed sealed greaseproof container. The machine 285, like the machine 245, is a conventional type of end closure applying machine and is not described in detail. The filling machine 275, the conveyor 280 and the closure applying machine 285 are driven by suitable means which are properly coordinated to the other steps of the complete continuous process. The filled and sealed containers are discharged from the capping machine and may be disposed of as desired.

The coordinated drive between the various steps of the complete process may be conveniently obtained by driving all of the several pieces of apparatus in the complete process from a single common power source, or if desired a plurality of power sources may be used and the coordinated drive obtained by suitable mechanical or electrical interconnections therebetween.

The description of the invention has been developed with particular reference to an embodiment of a body-forming machine in which a plurality of successive forming operations are conducted in a series of positions upon a single forming mandrel. Other machines for forming the container bodies may likewise be satisfactorily used in the practicing of the present invention, in particular that shown in the application Serial No. 165,352 of Lino Scusa and Rudolph Kilian for Manufacture of containers and the like, filed September 23, 1937, and assigned to the same assignee as this application.

It is evident from the foregoing description that there is provided a streamline production process in which each of the steps is operated in coordinated time relationship to provide a single continuous process for the complete manufacture of containers for oily or greasy susbtances, starting with a roll of paper material, or the like, and ending with a filled and sealed container, having an interior surface entirely impervious to seepage or wicking of its contents.

While the methods and forms of apparatus herein described constitute preferred embodiments of the invention, it is to be understood that the invention is not limited to these precise methods and forms of apparatus, and that changes may be made therein without departing from the scope of the invention which is defined in the appended claims.

What is claimed is:

1. In a process for forming containers of the character described in which a sheet of paper material is wound in convolute tubular form on a mandrel leaving a longitudinal inner seam, the step which comprises stripping said tube from said mandrel while maintaining the seam in a predetermined position relative to the mandrel and applying a narrow band of surfacing material to the inner seam of said tube while said tube is maintained in said predetermined positioning.

2. In the process for forming containers of the character described in which a sheet of paper material is wound into tubular form on a mandrel leaving an inner seam, the step which comprises applying a narrow band of surfacing material to the seam as said tube is being stripped from said mandrel.

3. In a process for forming containers of the character described in which a plurality of strips of paper are simultaneously wound into container bodies on a mandrel leaving an inner seam, the step which comprises applying a narrow band of surfacing material to the seams as said bodies are being stripped from said mandrel.

4. In a process for the formation of the containers of the character described in which a sheet of paper material having a greaseproof surfacing thereon is wound on a mandrel into the form of a convolute container body having a longitudinal inner seam, the steps which comprise indexing said body to bring the seam to a predetermined position, stripping said container body from said mandrel with said seam in a predetermined position, and applying a narrow band of greaseproofing material to the interior of said container along said seam, said greaseproofing material being of a character adapted to form an impervious and homogeneous greaseproof layer with said surfacing on said sheet of paper material and to prevent wicking of the contents of the container into the body thereof.

5. In a continuous process of the character described in which container bodies are formed on a mandrel from a jumbo roll of paper material, the steps comprising cutting paper material from said jumbo roll into a sheet having a length sufficient to form a wound container body, winding said sheet on said mandrel to form a convolute container body having an inner seam, applying adhesive to said paper sheet to secure the container body in wound form and provide adhesive material on the outer surface of the body, transferring said container body to a label applying station, applying a label to the outer surface of the container body in a position to be secured by the adhesive material on said surface, stripping said container body from said mandrel, applying a coating of greaseproof material to the interior surface of the container body and along said seam, applying a coating of greaseproofing material to the end of the formed body to provide a homogeneous greaseproof surfacing with said applied coating and form a completely impervious interior surface upon said container body, and crimping a closure on the end of said container body provided wtih said greaseproof coating.

6. In a continuous process of the character described in which a plurality of container bodies are simultaneously formed on a mandrel from a jumbo roll of paper material having a width corresponding to the height of a plurality of containers laid end to end, the steps comprising cutting paper material from said jumbo roll into a plurality of sheets having a length sufficient to form a wound container body and a width corresponding to the height of the container, simultaneously winding said plurality of sheets on said mandrel to form a plurality of convolute container bodies having an inner seam applying adhesive to said paper sheets to secure the container bodies in wound form and provide adhesive material on the outer surfaces of the bodies, transferring said plurality of container bodies to a label applying station, simultaneously applying a label to the outer surfaces of the plurality of container bodies in a position to be secured by the adhesive material on said surfaces, stripping said plurality of container bodies from said mandrel, applying a coating of greaseproof material to the interior surface and along said seam of each of the container bodies, applying a coating of greaseproof material to an end of the formed bodies to provide a homogeneous greaseproof surfacing with said applied coating and form a completely impervious interior surface upon said container bodies, and crimping a closure on the end of the container bodies provided with said greaseproof coating.

7. In a continuous process of the character described in which a plurality of container bodies are simultaneously formed on a mandrel from a jumbo roll of paper material having a width corresponding to the height of a plurality of containers laid end to end, the steps comprising cutting paper material from said jumbo roll into a plurality of sheets having a length sufficient to form a wound container body and a width corresponding to the height of the container, simultaneously winding said plurality of sheets on said mandrel to form a plurality of convolute container bodies having an inner seam, applying adhesive to said paper sheets to secure the container bodies in wound form and provide adhesive material on the outer surfaces of the bodies, transferring said plurality of container bodies along the length of said mandrel to a label applying station, simultaneously applying a label to the exterior surfaces of the plurality of container bodies, stripping said plurality of container bodies from said mandrel and applying a coating of greaseproof material to the interior surface and along said seam of each of the container bodies during the stripping operation, applying a coating of greaseproof material to an end of the formed bodies to provide a homogeneous grease-proof surfacing with said applied coating and form a completely impervious interior surface upon said container bodies, and crimping a closure on the end of the container bodies provided with said greaseproof coating.

8. In an apparatus of the character described for cutting a sheet of paper material from a jumbo roll for winding on a mandrel into the form of a container body, a shearing knife, a cooperating shearing knife, means carried by said cooperating shearing knives and operable therewith for bending the sheared end portion of said sheet of paper material in such direction as to cause said end portion to adhere to the shape of the wound container body, and thereafter winding said sheet of paper into the form of a container body with said end portion adhering to the wound container body.

9. In an apparatus of the character described for cutting a sheet of paper material from a jumbo roll for winding on a mandrel into the form of a container body, a shearing knife, a cooperating shearing knife, a member carried by one of said shearing knives and movable therewith to cause bending of the sheared end of said sheet of paper material, cooperating means adapted to receive said last mentioned member and assist in bending said end of the sheet of paper material in such direction as to cause said end portion to adhere to the shape of the wound container body, and thereafter winding said sheet of paper into the form of a container body with said end portion adhering to the wound container body.

10. In apparatus for forming containers of the character described and having mandrel means for simultaneously winding a plurality of strips of paper into container bodies leaving an inner seam, the combination of means for applying a narrow band of surfacing material to the seams of the container bodies as the bodies are stripped from the mandrel.

11. In apparatus of the character described the combination of a winding mandrel for winding a web of paper into tubular form leaving an inner seam, and means for applying a narrow band of surfacing material to the seam to prevent wicking of the contents of the container into the paper walls thereof.

12. In apparatus of the character described the combination of a winding mandrel for winding a web of paper into tubular form leaving an inner seam, spray means for applying a narrow band of surfacing material to the seam to prevent wicking of the contents of the container into the body thereof, means for stripping the tube from the mandrel, and means for controlling said spray means to initiate spray thereof as the tube is stripped from said mandrel.

13. In apparatus of the character described the combination of a winding mandrel for winding a plurality of convolute tubes simultaneously, each having an inner seam positioned in corresponding relationship to the others, means for applying a narrow band of surfacing material to all of said tubes while occupying relative positions corresponding to those while on the mandrel.

14. In apparatus of the character described the combination of a mandrel for winding a plurality of convolute tubes simultaneously, each having an inner seam positioned in the same relative location, means for stripping said tubes from the mandrel while maintaining said corresponding positioning, and means for applying a narrow band of surfacing material to all of said tubes in sequence while in said corresponding positioning with respect to each other.

15. In apparatus of the character described for forming containers from a web of paper in a continuous operation and having mandrel means for winding said web into a tubular container body leaving an inner seam, the combination of means for applying a narrow band of surfacing material to said inner seam as the tubular body is stripped from the mandrel, and means for thereafter applying a sealing material to an end of the body in impervious sealed relation with the body wall and with said band in preparation for reception of a metal end piece in crimped relation thereon.

16. In apparatus of the character described for forming containers from a web of paper in a continuous operation and having mandrel means for simultaneously winding said web into a plurality of convolute container bodies axially arranged with respect to each other and leaving an inner seam, the combination of means for stripping said container bodies from the mandrel, means for applying a narrow band of surfacing material to the inner seam of said bodies, conveyor means for transferring said container bodies in side by side relation, and means for applying a sealing material to the ends of said container bodies in impervious sealed relation with the wall of the bodies and with said band in preparation for the reception of metal end pieces in crimped relation thereof.

17. In a process for forming containers of the character described in which a sheet of paper material having a greaseproof surfacing thereon is wound on a mandrel into the form of a tubular container body having a longitudinal inner seam, the step which comprises stripping said container body from said mandrel while maintaining the mandrel stationary with the seam in a predetermined angular position relative to the axis of the mandrel and applying a narrow band of surfacing material to the seam as the container body is stripped from the mandrel, said surfacing material being of a character adapted to form an impervious and homogeneous greaseproof layer with said surfacing on said sheet of paper material.

18. A process for forming containers of the character described in which a sheet of paper material is cut from a jumbo roll for winding into the form of a container body comprising the steps of shearing said paper material between cooperating knives and simultaneously bending the sheared end in such direction as to cause said end to adhere to the shape of the wound container body, and thereafter winding the sheared strips into the form of container bodies with said sheared and bent ends outermost and in adhering relation to the wound container body.

19. In apparatus for forming containers of the character described and having mandrel means for winding a sheet of paper material into tubular form leaving a longitudinal inner seam, the combination of means for stripping said tube from said mandrel while maintaining the seam in a predetermined position relative to the mandrel, and means for applying a narrow band of surfacing material to the inner seam of said tube as the tube is being stripped from said mandrel.

20. In an apparatus of the character described the combination of a winding mandrel for winding a web of paper having a greaseproof surfacing thereon into a convolute container body having a longitudinal inner seam, means for indexing said body to bring the seam to a predetermined position, means for stripping said body from the mandrel with said seam in said predetermined position, and means for applying a narrow band of greaseproofing material to the interior of said container body along said seam, said greaseproofing material being of a character adapted to coalesce with the surfacing on said paper web to form an impervious and homogeneous greaseproof surfacing on the interior of said container body and prevent wicking of the contents of the container into the body thereof.

21. In a process of the character described for forming container bodies from paper material, the steps which comprise winding a paper sheet into the form of a multi-wall container body having a predetermined tubular shape, applying adhesive to at least a substantial portion of said paper sheet to cause adjacent layers of the body wall to be adhesively secured together around the periphery of the formed body, clamping said container body around substantially the entire periphery thereof while still in a relatively limp condition to hold the body in said predetermined tubular shape during setting of said adhesive, and passing the body so clamped through a conditioning zone providing for setting of the adhesive under controlled temperature conditions.

22. In a process of the character described for forming container bodies from paper material, the steps which comprise winding a sheet of paper material on a mandrel into the form of a multi-wall tubular body of predetermined shape, applying fluid adhesive to at least a substantial portion of said paper sheet to cause adjacent layers of the body wall to be adhesively secured together around the entire periphery of the formed body, stripping said body from said mandrel prior to setting of the adhesive and while the body is in a relatively limp condition, clamping said body around the exterior thereof to hold the body in said predetermined shape, and passing the body so clamped through a conditioning zone providing for setting of the adhesive securing the body in the wound form.

23. In an apparatus of the character described for forming container bodies from paper material, mandrel means for winding a sheet of paper material into the form of a plurality of multi-walled convolute tubular bodies of predetermined shape, means for applying fluid adhesive to at least a substantial portion of said paper sheet to cause adjacent layers of the body wall to be adhesively secured together around the entire periphery of the formed bodies, means for stripping said plurality of bodies from said mandrel means in axial alignment prior to setting of the adhesive and while the bodies are in a relatively limp condition, a conditioner including a conveyor means, means for feeding said bodies as received from said stripping means in axial alignment directly to said conveyor means while still in a limp condition, and means carried by said conveyor means and effective along substantially the entire length and around substantially the entire periphery of the body for clamping each said body to hold the same in said predetermined shape during passage through said conditioner and setting of the adhesive securing the body in the wound form.

24. In apparatus of the character described and forming a plurality of container bodies from paper material comprising means for winding the said paper material into the form of a plurality of tubular container bodies in axial alignment, means for applying adhesive to a substantial portion of said paper material to secure the bodies in wound form, means for stripping said bodies from the winding means prior to the setting of the adhesive and while the bodies are in a relatively limp condition, conveyor means for receiving the bodies as discharged from said stripping means and for conveying said bodies at a speed in excess of the rate of stripping thereof to provide a spacing therebetween, means for engaging each of said bodies in said spaced relation along substantially the entire length and around substantially the entire periphery thereof for clamping the same to hold said bodies in wound condition during passage along a conditioning zone to provide for the setting of the adhesive and the securing of the body in wound form.

RUDOLF WM. von SYDOW.
WALTER E. SOOY.